(12) United States Patent
Drzymala et al.

(10) Patent No.: US 9,367,723 B1
(45) Date of Patent: Jun. 14, 2016

(54) ARRANGEMENT FOR AND METHOD OF COMPATIBLY DOCKING A CORDLESS ELECTRO-OPTICAL READER WITH DIFFERENT DOCKING STATIONS

(71) Applicant: SYMBOL TECHNOLOGIES, LLC, Lincolnshire, IL (US)

(72) Inventors: Mark E. Drzymala, Saint James, NY (US); Edward D. Barkan, Miller Place, NY (US); Joseph D. Giordano, Bayville, NY (US); Yuly Mitelman, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/697,929

(22) Filed: Apr. 28, 2015

(51) Int. Cl.
  G06K 7/06 (2006.01)
  G06K 7/10 (2006.01)
  H02J 7/00 (2006.01)

(52) U.S. Cl.
  CPC ............. *G06K 7/10881* (2013.01); *H02J 7/007* (2013.01); *H02J 7/0045* (2013.01); *H02J 7/0052* (2013.01)

(58) Field of Classification Search
  USPC ................................ 235/441, 462.01–472.03
  See application file for complete search history.

(56) References Cited

U.S. PATENT DOCUMENTS

| | | | | |
|---|---|---|---|---|
| 5,828,966 A | * | 10/1998 | Davis | H02J 7/0042 320/115 |
| 6,424,842 B1 | * | 7/2002 | Winstead | H01R 13/2442 455/557 |
| 6,860,427 B1 | * | 3/2005 | Schmidt | G02B 26/10 235/462.14 |
| 7,102,328 B2 | * | 9/2006 | Long | B26B 19/3833 320/115 |
| 7,778,023 B1 | * | 8/2010 | Mohoney | G06F 1/1632 312/223.2 |
| 8,662,399 B2 | * | 3/2014 | Vassura | G06K 7/10881 235/375 |
| 9,032,130 B2 | * | 5/2015 | Aldana | H04B 10/801 710/303 |
| 2004/0057199 A1 | * | 3/2004 | Azuchi | G06F 1/1626 361/679.3 |
| 2005/0064762 A1 | * | 3/2005 | Yu | H01R 13/641 439/488 |
| 2007/0002533 A1 | * | 1/2007 | Kogan | B60R 11/0241 361/679.41 |
| 2007/0024576 A1 | * | 2/2007 | Hassan | G06F 1/1632 345/156 |
| 2011/0285765 A1 | * | 11/2011 | Lamontagne | B41J 3/36 347/3 |

* cited by examiner

*Primary Examiner* — Tuyen K Vo

(57) ABSTRACT

A cordless, electro-optical reader is compatibly docked with different docking stations having station contacts located at different locations. A rechargeable battery is mounted in a housing that extends along a longitudinal axis. Multiple housing contacts are located on the housing. Some housing contacts conduct electrical power to recharge the battery; other housing contacts conduct electrical signals to and from a controller. Each housing contact has one exposed contact portion facing in a first direction, e.g., axially along the longitudinal axis, to make electro-mechanical contact with station contacts located at one location of one docking station, and another exposed contact portion facing in a different second direction, e.g., transversely of the longitudinal axis, to make electro-mechanical contact with station contacts located at another location of another docking station.

20 Claims, 4 Drawing Sheets

ARRANGEMENT FOR AND METHOD OF COMPATIBLY DOCKING A CORDLESS ELECTRO-OPTICAL READER WITH DIFFERENT DOCKING STATIONS

BACKGROUND OF THE INVENTION

The present disclosure relates generally to an arrangement for, and a method of, compatibly docking a cordless, electro-optical reader with different docking stations, e.g., desktop, wall-mount, or presentation cradles, that have station contacts located at different locations.

Both laser-based and solid-state, imager-based readers, also known as scanners, have been used, in both handheld and/or hands-free modes of operation, to electro-optically read symbol targets, such as one- and/or two-dimensional bar code symbols, to be decoded, as well as document targets, such as forms, labels, receipts, prescriptions, drivers' licenses, identification badges, payment/loyalty cards, and the like, to be imaged. In the hands-free mode, the reader is stationary, and a user typically presents a target to a window of the reader in a presentation mode. In the handheld mode, the reader is movable, and the user typically holds the reader in his or her hand, aims the reader at the target, and manually actuates a trigger to initiate reading.

The user may first lift the reader from a countertop or like support surface, or from a docking station, such as a stand or cradle, mounted on a support surface. There are different types of docking stations. For example, one type is a desktop cradle in which the reader is docked in an inactive reading state with its handle generally parallel to a horizontal countertop; another is a wall-mount cradle in which the reader is docked in an inactive reading state with its handle generally parallel to a vertical wall; and still another type is a presentation cradle in which the reader is docked in an active reading state with its handle generally tilted forwardly relative to a horizontal countertop.

Many such readers are cordless and, when removed from their cradles, require an on-board, rechargeable battery pack to provide electrical power for operation. Each aforementioned cradle has a pair of electrical, station contacts typically used for recharging the battery pack when the reader is docked. Each aforementioned cradle also has additional electrical, station contacts typically used for sending electrical signals, e.g., data and control signals, to and from the reader when the reader is docked. These station contacts are typically located at different locations, oriented at different orientations, and face in different directions, in their cradles. For example, the presentation cradle advantageously has tilted station contacts to contact with tilted housing contacts on the battery pack of the forwardly tilted reader with an increased contact force due to a forward moment of inertia provided by the forwardly tilted reader. For wall-mount and desktop cradles, the station contacts advantageously lie vertically to contact with bottom-facing housing contacts on the battery pack of the reader. Although the known battery packs are generally satisfactory for their intended purpose, each battery pack can only be used with one type of cradle.

Accordingly, there is a need to make a battery pack compatible with more than one type of cradle.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
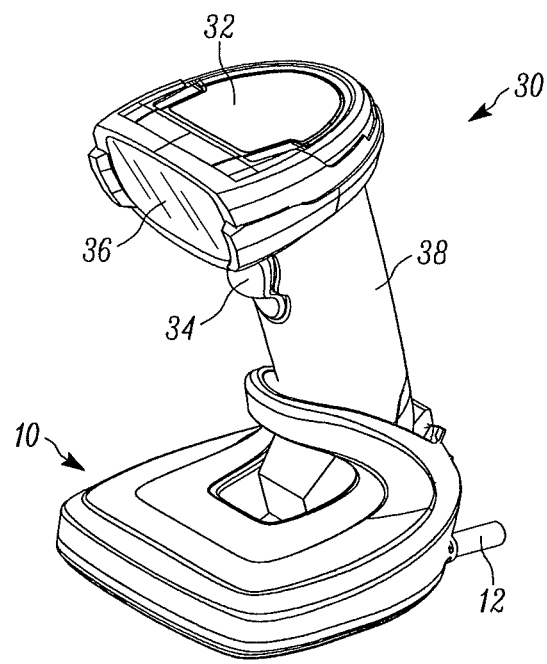
FIG. 1A is a perspective view of a cordless, electro-optical reader mounted in a presentation cradle in accordance with the prior art.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and arrangement components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for compatibly docking a cordless, electro-optical reader, either laser-based or imager-based, with different docking stations, e.g., a presentation cradle, a wall-mount cradle, or a desktop cradle, having electrical, station contacts located at different locations. The arrangement includes a housing, a rechargeable battery in the housing, and a plurality of electrical, housing contacts located on, and exteriorly of, the housing. At least one of the housing contacts is operatively connected to the battery. Each housing contact has one exposed contact portion facing in a first direction to make electro-mechanical contact with station contacts located at one location of one docking station, and another exposed contact portion facing in a second direction that is different from the first direction to make electro-mechanical contact with station contacts located at another location of another docking station. Thus, the arrangement is compatible with more than one type of cradle.

Advantageously, a pair of the housing contacts is operatively connected to the battery, for conducting electrical power to the battery to recharge the battery when the reader is docked, and the other housing contacts are operatively connected to an electrical controller, for conducting electrical signals, e.g., data and control signals, to and from the controller when the reader is docked.

A method of compatibly docking a cordless, electro-optical reader with different docking stations having electrical, station contacts located at different locations, in accordance with another aspect of this disclosure, is performed by mounting a rechargeable battery in a housing, by locating a plurality of electrical, housing contacts on, and exteriorly of, the housing, by operatively connecting at least one of the housing contacts to the battery, and by configuring each housing contact with one exposed contact portion facing in a first direction to make electro-mechanical contact with station contacts located at one location of one docking station, and with another exposed contact portion facing in a second direction that is different from the first direction to make electro-mechanical contact with station contacts located at another location of another docking station.

Turning now to the drawings, reference numeral 30 generally identifies a cordless, electro-optical reader in accordance with the prior art that is ergonomically advantageously configured as a gun-shaped housing having an upper barrel or body 32 and a lower handle 38 extending rearwardly away from the body 32. A window 36 is located adjacent a front or nose of the body 32. The reader 30 is either held by the handle 38 in an operator's hand and used in a handheld mode, as described above, in which a trigger 34 is manually depressed to initiate reading of symbol/document targets in a range of working distances relative to the window 36, and/or is mounted in a forwardly-tilted orientation, as shown, in a presentation cradle 10 and used in a hands-free mode in which symbol/document targets are presented in a range of working distances relative to the window 36 for reading. A cable 12 is connected to the cradle 10 to deliver electrical power to the cradle 10 and to support bidirectional communications between the docked reader 30 and a remote host (not illustrated).

Figure 1B:
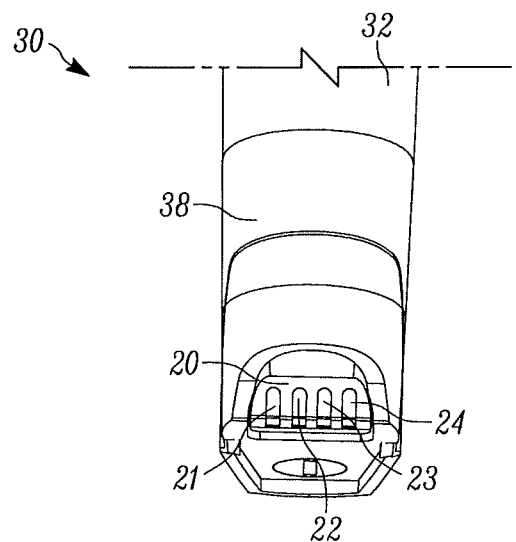
FIG. 1B is a broken-away rear view of the rear of the reader of FIG. 1A in accordance with the prior art.

As best seen in FIG. 1B, a battery pack 20 containing a rechargeable battery is inserted into a lower end of the handle 38. The pack 20 has a plurality of electrical, housing contacts 21, 22, 23 and 24 located on, and exteriorly of, the pack 20. Each of these housing contacts lies in a common tilted plane and faces in a direction rearwardly of the handle 38. A pair of these housing contacts is operatively connected to the battery within the pack 20, for conducting electrical power from the cable 12 to the battery to recharge the battery when the reader 30 is docked in the cradle 10. The reader 30 is powered by the charged battery upon removal from the cradle 10. The other housing contacts conduct electrical signals between the reader 30 and the remote host when the reader 30 is docked in the cradle 10. All of these co-planar, housing contacts 21, 22, 23 and 24 face in the same rearward direction and at the same tilted orientation to make electro-mechanical contact with a corresponding plurality of tilted station contacts located at a rear location of the cradle 10 and facing in a forward direction. The tendency of the forwardly-tilted reader 30 to tilt forwards toward the countertop increases the contact force between the housing contacts 21, 22, 23 and 24 and the station contacts of the cradle 10.

Figure 2A:
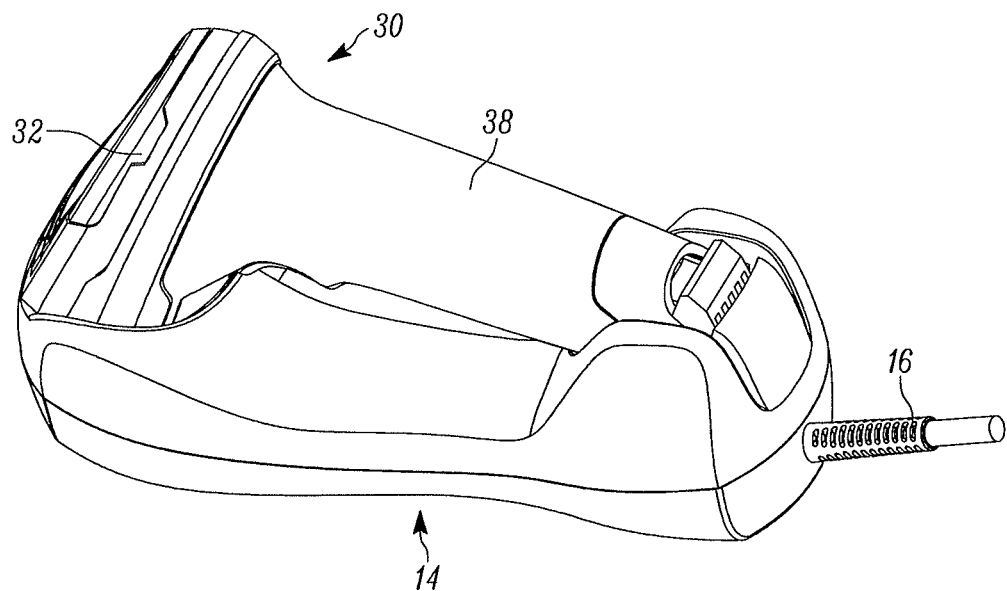
FIG. 2A is a perspective view of a cordless, electro-optical reader mounted in a desktop cradle in accordance with the prior art.

FIG. 2A depicts another gun-shaped reader 30 in accordance with the prior art that is mounted in an inactive reading state with its handle 38 generally parallel to a horizontal countertop in a downward orientation, as shown, in a desktop cradle 14. A cable 16 is connected to the cradle 14 to deliver electrical power to the cradle 14 and to support bidirectional communications between the docked reader 30 and a remote host (not illustrated).

Figure 2B:
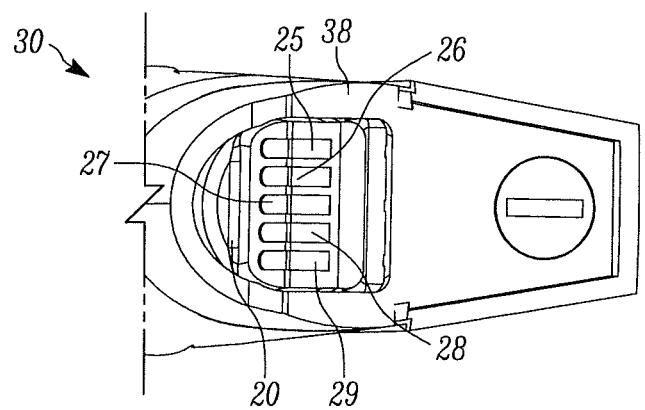
FIG. 2B is a broken-away bottom end view of the bottom of the reader of FIG. 2A in accordance with the prior art.
Figure 3:
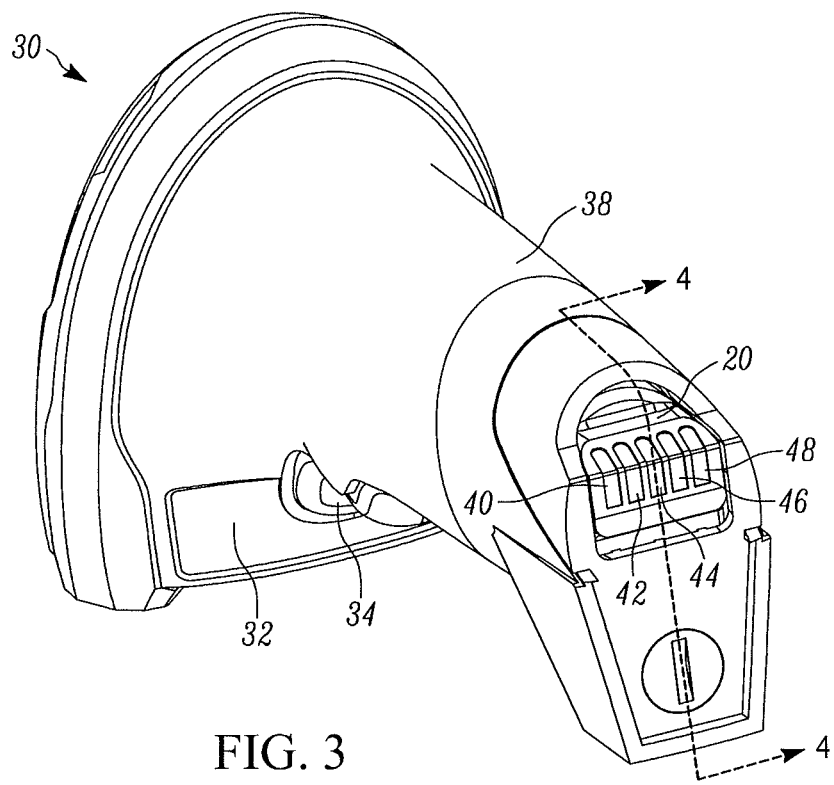
FIG. 3 is a perspective view of a cordless, electro-optical reader that can compatibly be mounted in either the presentation cradle of FIG. 1A or the desktop cradle of FIG. 2A in accordance with the invention.
Figure 4:
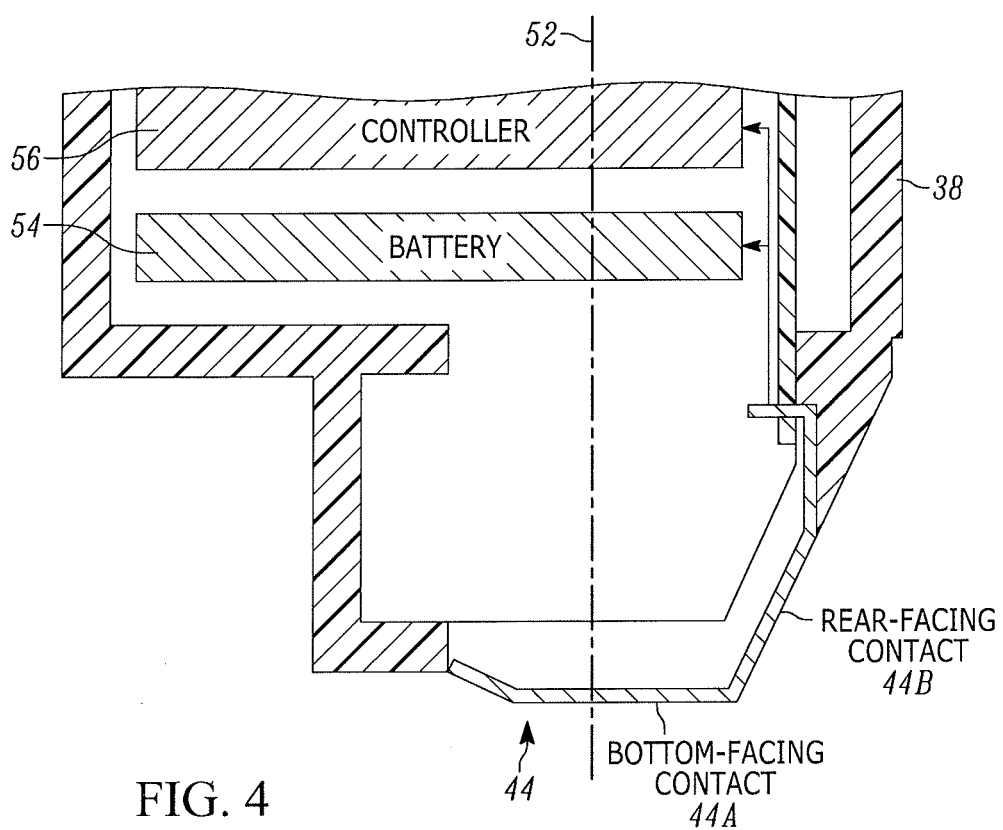
FIG. 4 is a broken-away, enlarged sectional view taken on line 4-4 of FIG. 3.

As best seen in FIG. 2B, a battery pack 20 containing a rechargeable battery is inserted into a lower end of the handle 38. The pack 20 has a plurality of electrical, housing contacts 25, 26, 27, 28 and 29 located on, and exteriorly of, the pack 20. Each of these housing contacts lies in a common bottom plane and faces in a direction downwardly past a bottom end of the handle 38. A pair of these housing contacts is operatively connected to the battery within the pack 20, for conducting electrical power from the cable 16 to the battery to recharge the battery when the reader 30 is docked in the cradle 14. The reader 30 is powered by the battery upon removal from the cradle 14. The other housing contacts conduct electrical signals between the reader 30 and the remote host when the reader 30 is docked in the cradle 14. All of these co-planar, housing contacts 25, 26, 27, 28 and 29 face in the same downward direction to make electro-mechanical contact with a corresponding plurality of station contacts located at a rear location of the cradle 14 and facing in an upward direction. The weight of the reader 30 acting toward the countertop increases the contact force between the housing contacts 25, 26, 27, 28 and 29 and the station contacts of the cradle 14.

As described so far, the housing contacts 21, 22, 23 and 24 on the pack 20 face rearwardly in one direction, while the housing contacts 25, 26, 27, 28 and 29 on the pack 20 face downwardly in another direction. Hence, the same battery pack 20 is incompatible and cannot be used with the different cradles 10, 14.

Figure 7:
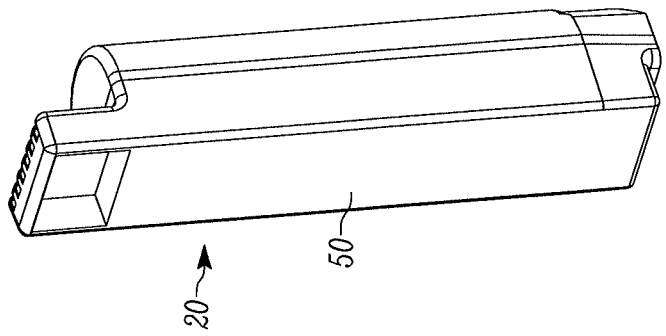
FIG. 7 is a left side perspective view of the battery pack of FIG. 5.
Figure 6:
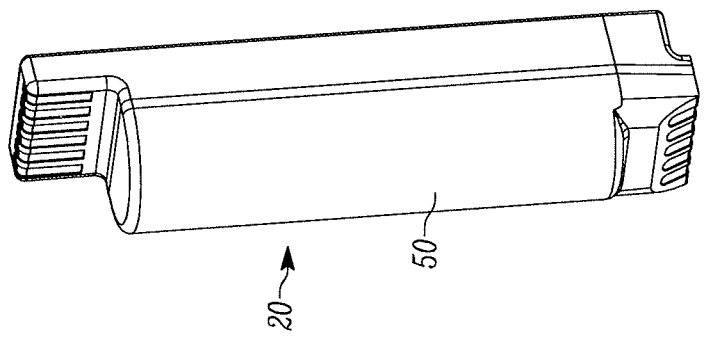
FIG. 6 is a right side perspective view of the battery pack of FIG. 5.
Figure 5:
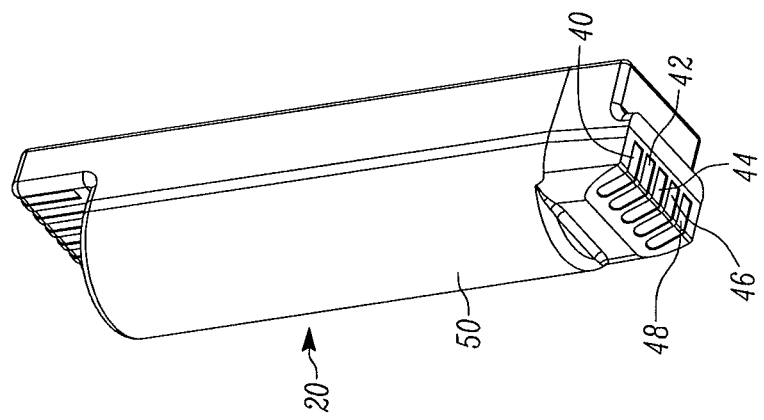
FIG. 5 is a bottom perspective view of a battery pack in isolation after removal from the reader of FIG. 3.

To provide such compatibility, the battery pack 20 in FIGS. 3-7 is provided with a plurality of electrical, housing contacts, e.g., 40, 42, 44, 46 and 48 located on, and exteriorly of, an elongated housing 50 for the pack 20. The housing 50 extends along a longitudinal axis 52. The housing 50 can be a discrete component, as illustrated in FIGS. 5-7, that is removable from the handle 38, or it can be integral with the reader 30 and constitute the handle 38 itself. Each housing contact has one exposed contact portion, e.g., representative bottom contact portion 44A in FIG. 4, that faces in a first direction, e.g., axially along the longitudinal axis 52. The one exposed contact portion need not face axially as depicted in FIGS. 3-7, but could also face forwardly, rearwardly, rightwardly, or leftwardly of the longitudinal axis 52. Each housing contact also has another exposed contact portion, e.g., representative rear contact portion 44B in FIG. 4, that faces in a different second direction, e.g., transversely of the longitudinal axis 52. The other exposed contact portion need not face rearwardly as depicted in FIGS. 3-7, but could also face forwardly, rightwardly, leftwardly, or axially of the longitudinal axis 52. All of the bottom contact portions of the housing contacts 40, 42, 44, 46 and 48 lie in the same plane and face in the same direction to make electro-mechanical contact with a corresponding plurality of station contacts located at a rear location of the cradle 14. All of the rear contact portions of the housing contacts 40, 42, 44, 46 and 48 lie in the same plane and face in the same direction to make electro-mechanical contact with a corresponding plurality of station contacts located at a rear location of the cradle 10.

Thus, the same battery pack 20 of FIGS. 3-7 can be docked in different cradles 10, 14. Although the cradles 10, 14 have been illustrated and described as being two discrete, different docking stations, the invention described herein is not intended to be so limited since it is also possible that a single docking station can be modified to, in effect, constitute another docking station after modification. In other words, the same battery pack 20 can be used in one unmodified cradle, and then, after that one cradle has been modified, the same battery pack 20 can be used again. As used in the claims herein, the term "another docking station" can also refer to such a modified docking station.

Advantageously, each housing contact 40, 42, 44, 46 and 48 is a bent, electrically conductive strip, and the respective bottom and rear contact portions form an obtuse angle with each other. The electro-mechanical contact between the station contacts of the bottom contact portions 44A on the one hand, or the rear contact portions 44B on the other hand, can be either a surface contact or a linear contact. If a linear contact, then the linear corner at which each strip is bent would advantageously constitute both the bottom and rear contact portions and make the electro-mechanical contact with the different cradles.

A pair of the housing contacts 40, 42, 44, 46 and 48 is operatively connected to a battery 54 mounted in the pack 20, for conducting electrical power to the battery 54 to recharge the battery 54 when the reader is docked in either cradle 10 or 14. The other housing contacts are operatively connected to an electrical controller or programmed microprocessor 56 mounted in the pack 20, for conducting electrical signals, e.g., data and control signals, to and from the controller 56 when the reader 30 is docked in either cradle 10 or 14. In some constructions, the controller is mounted outside the pack 20 but in the reader 30, in which case, the other housing contacts pass through the pack 20 for connection to the outside controller. The controller is also tasked with processing and decoding a symbol target into decoded data that identifies a product associated with the symbol target, and enables information, such as the product's price, to be retrieved from a price database, or with processing a document target into a picture.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for compatibly docking a cordless, electro-optical reader with different docking stations having electrical, station contacts located at different locations, comprising:
   a housing;
   a rechargeable battery in the housing;
   a plurality of electrical, housing contacts located on, and exteriorly of, the housing, at least one of the housing contacts being operatively connected to the battery, each housing contact having one exposed contact portion facing in a first direction to make electro-mechanical contact with station contacts located at one location of one docking station, and another exposed contact portion facing in a second direction that is different from the first direction to make electro-mechanical contact with station contacts located at another location of another docking station.

2. The arrangement of claim 1, wherein the housing is removable from the reader.

3. The arrangement of claim 1, wherein the housing is integral with, and forms a handle for, the reader.

4. The arrangement of claim 1, wherein each housing contact is a bent, electrically conductive strip, and wherein the electro-mechanical contact between the station contacts and the housing contacts is one of a surface contact and a linear contact.

5. The arrangement of claim 1, wherein the housing extends along a longitudinal axis, and wherein the one exposed contact portion of each housing contact faces axially along the longitudinal axis.

6. The arrangement of claim 1, wherein the housing extends along a longitudinal axis, and wherein the other exposed contact portion of each housing contact faces transversely of the longitudinal axis.

7. The arrangement of claim 1, wherein the one and the other exposed contact portions of each housing contact form an obtuse angle with each other.

8. The arrangement of claim 1, wherein a pair of the housing contacts is operatively connected to the battery, for conducting electrical power to the battery to recharge the battery when the reader is docked.

9. The arrangement of claim 8, wherein the other housing contacts are operatively connected to an electrical controller, for conducting electrical signals to and from the controller when the reader is docked.

10. The arrangement of claim 1, wherein one of the docking stations is a presentation cradle, and wherein another of the docking stations is a desktop cradle.

11. A method of compatibly docking a cordless, electro-optical reader with different docking stations having electrical, station contacts located at different locations, comprising:
    mounting a rechargeable battery in a housing;
    locating a plurality of electrical, housing contacts on, and exteriorly of, the housing;
    operatively connecting at least one of the housing contacts to the battery; and
    configuring each housing contact with one exposed contact portion facing in a first direction to make electro-mechanical contact with station contacts located at one location of one docking station, and with another exposed contact portion facing in a second direction that is different from the first direction to make electro-mechanical contact with station contacts located at another location of another docking station.

12. The method of claim 11, and removing the housing from the reader.

13. The method of claim 11, and configuring the housing to be integral with, and to form a handle for, the reader.

14. The method of claim 11, and configuring each housing contact as a bent, electrically conductive strip, and the electro-mechanical contact between the station contacts and the housing contacts is one of a surface contact and a linear contact.

15. The method of claim 11, and extending the housing along a longitudinal axis, and configuring the one exposed contact portion of each housing contact to face axially of the longitudinal axis.

16. The method of claim 11, and extending the housing along a longitudinal axis, and configuring the other exposed contact portion of each housing contact to face transversely of the longitudinal axis.

17. The method of claim 11, and configuring the one and the other exposed contact portions of each housing contact to form an obtuse angle with each other.

18. The method of claim 11, and operatively connecting a pair of the housing contacts to the battery, and recharging the battery via the pair of the housing contacts by conducting electrical power to the battery when the reader is docked.

19. The method of claim 18, and operatively connecting the other housing contacts to an electrical controller, and conducting electrical signals to and from the controller when the reader is docked.

20. The method of claim 11, and configuring one of the docking stations as a presentation cradle, and configuring another of the docking stations as a desktop cradle.

* * * * *